(12) United States Patent  (10) Patent No.: US 9,417,045 B2
Sugamata  (45) Date of Patent: Aug. 16, 2016

(54) SCALE HOLDING DEVICE AND ENCODER (71) Applicant: CANON KABUSHIKI KAISHA, Tokyo (JP)

(72) Inventor: Yoshihiko Sugamata, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 29 days.

(21) Appl. No.: 14/276,460

(22) Filed: May 13, 2014

(65) Prior Publication Data
US 2014/0338208 A1  Nov. 20, 2014

(30) Foreign Application Priority Data
May 15, 2013  (JP) ................. 2013-103112

(51) Int. Cl.
G01D 5/347  (2006.01)
G01B 3/00  (2006.01)
G01D 5/244  (2006.01)

(52) U.S. Cl.
CPC ............ *G01B 3/004* (2013.01); *G01D 5/24442* (2013.01); *G01D 5/34707* (2013.01); *G01D 5/34753* (2013.01)

(58) Field of Classification Search
CPC .................................................. G01D 5/34753
USPC ......................................................... 33/706
See application file for complete search history.

(56) References Cited

U.S. PATENT DOCUMENTS

| 3,816,003 | A | * | 6/1974 | Litke | G01D 5/34753 33/707 |
| 4,136,958 | A | * | 1/1979 | Nelle | B23Q 11/085 250/237 G |
| 4,414,746 | A | * | 11/1983 | Takizawa | G01B 3/002 33/706 |
| 4,569,137 | A | | 2/1986 | Ichikawa | |
| 4,573,000 | A | * | 2/1986 | Nelle | G01D 5/2457 250/237 G |
| 4,602,436 | A | * | 7/1986 | Ernst | G01D 5/36 250/237 G |
| 5,065,525 | A | * | 11/1991 | Szenger | G01D 5/34707 33/702 |
| 5,279,043 | A | | 1/1994 | Rieder et al. | |
| 5,375,338 | A | * | 12/1994 | Nelle | G01B 5/0014 33/702 |
| 5,611,148 | A | | 3/1997 | Affa | |
| 5,655,311 | A | * | 8/1997 | Affa | G01D 5/34761 33/702 |
| 6,442,861 | B1 | * | 9/2002 | Boge | F16C 41/007 33/703 |

(Continued)

FOREIGN PATENT DOCUMENTS

DE  9422021 U1  8/1997
EP  0506649 A2  9/1992

(Continued)

OTHER PUBLICATIONS

European Search Report issued in corresponding counterpart Application No. 14168350.8 dated Feb. 13, 2015.

*Primary Examiner* — Christopher Fulton
(74) *Attorney, Agent, or Firm* — Rossi, Kimms & McDowell LLP (57) ABSTRACT Provided is a scale holding device including a scale and an attachment plate holding the scale. The scale holding device includes the attachment plate configured to have a first surface abutting on a first lateral side of the scale and a second surface facing a rear side of the scale, a first adhesive material configured to removably adhere the second surface of the attachment plate and the rear side of the scale to each other, and a second adhesive material configured to adhere the scale and the attachment plate to each other on a second lateral side of the scale.

26 Claims, 3 Drawing Sheets (56) References Cited

U.S. PATENT DOCUMENTS 7,007,397 B2 * 3/2006 Kodama ............... G01B 5/0014
33/702
7,934,324 B2 * 5/2011 Tomiya .............. G01D 5/34707
33/702

FOREIGN PATENT DOCUMENTS

| JP | 60122317 A | 6/1985 |
| JP | 2006029973 A | 2/2006 |
| JP | 4477440 B2 | 6/2010 |

* cited by examiner

SCALE HOLDING DEVICE AND ENCODER

BACKGROUND OF THE INVENTION

1. Field of the Invention

The present invention relates to a scale holding device and an encoder.

2. Description of the Related Art

As devices for measuring positions and angles, there are optical-type encoders which include a scale serving as a measurement reference, a light projecting unit for projecting light onto the scale, and a light receiving unit for receiving light reflected from the scale. Such encoders include a linear encoder including an elongated (straight edge) scale, typically in the form of a metallic tape-like scale, and there are some methods (configurations) for fixing the scale to a mounting object. For example, the first method is a method for directly affixing a tape-like scale to a mounting object using a double-sided tape or the like. In this method, a highly-adhesive double-sided tape is typically used such that the scale does not peel off from a mounting object, resulting in a difficulty in repositioning (reusing) the scale. Thus, an accurate technique is required, to avoid the need for repositioning of the scale, upon affixing the scale to a mounting object. In addition, a dedicated tool may also be needed such that the scale is mounted at a desired position. Furthermore, when the scale is fixed with only double-sided tape, positional deviation may occur between a mounting object and the scale due to the deterioration of the adherence of double-sided tape over-time. The occurrence of positional deviation is difficult to recognize by direct measurement, resulting in an adverse effect on the measurement accuracy of the encoder. Furthermore, the second method is a method for fixing a tape-like scale to a mounting object via a dedicated holding member (attachment plate). Japanese Patent No. 4477440 discloses an elastic scale holding method for adhesively fixing a scale to a holding member (scale fixture) having elasticity or non-elasticity for different purposes. According to Japanese Patent No. 4477440, the effect of thermal expansion caused by temperature change is reduced and a portion of the adhesive is made to be a non-elastic layer which is used as a reference at the time of extension/contraction.

However, the holding method disclosed in Japanese Patent No. 4477440 is only suitable for a glass scale or the like formed of a hard material but is not suitable for a tape-like scale or the like having flexibility. A specific description will be given under the assumption that, when such a holding method is employed, a scale is firstly adhesively fixed to a holding member and then the holding member is fixed to a mounting object. Also, a reference member (non-elastic layer) for performing positioning of the scale with respect to the holding member by firmly fixing the scale to the mounting object is present at one portion (cross-section from one lateral side to the other lateral side) of the rear side of the scale. Hence, if the surface of the mounting object is distorted, such distortion is directly transmitted to the scale when the holding member with the scale being held thereon is mounted on the mounting object. Thus, when a tape-like soft or flexible scale is used, it is highly probable to exert an adverse effect on the measurement accuracy of the encoder. Furthermore, in the holding method disclosed in Japanese Patent No. 4477440 in connection with the first method, the rear side and the lateral sides of the scale are adhesively fixed to the holding member via an elastic layer in addition to the reference member, and thus, repositioning cannot be achieved when a tape-like scale is used. In particular, when the tape-like scale is affixed to the holding member, it is difficult to perform unique positioning of the scale with respect to the holding member, and thus, the scale cannot be repositioned, which is a disadvantage in terms of the efficiency (ease) of mounting operations.

SUMMARY OF THE INVENTION

The present invention provides, for example, a scale holding device that is advantageous for ease of mounting and the reduction of the distortion which may be imposed on a scale, when the scale is indirectly fixed to a mounting object.

According to an aspect of the present invention, a scale holding device is provided that includes a scale; an attachment plate configured to holds the scale and have a first surface abutting on a first lateral side of the scale and a second surface facing a rear side of the scale; a first adhesive material configured to removably adhere the second surface of the attachment plate and the rear side of the scale to each other; and a second adhesive material configured to adhere the scale and the attachment plate to each other on a second lateral side of the scale.

Further features of the present invention will become apparent from the following description of exemplary embodiments with reference to the attached drawings.

DESCRIPTION OF THE EMBODIMENTS

Hereinafter, preferred embodiments of the present invention will be described with reference to the drawings.

(First Embodiment)

Figure 1:
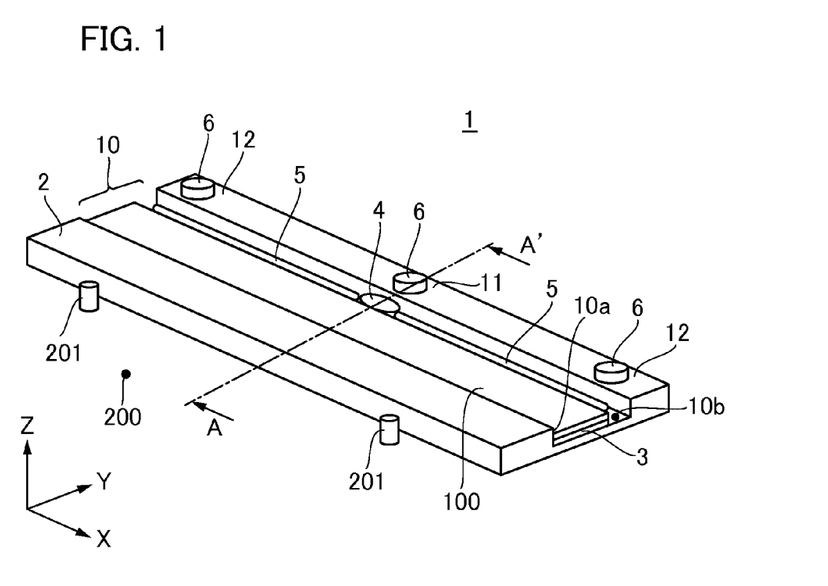
FIG. 1 is a diagram illustrating a configuration of a scale holding device according to a first embodiment of the present invention.
Figure 2:
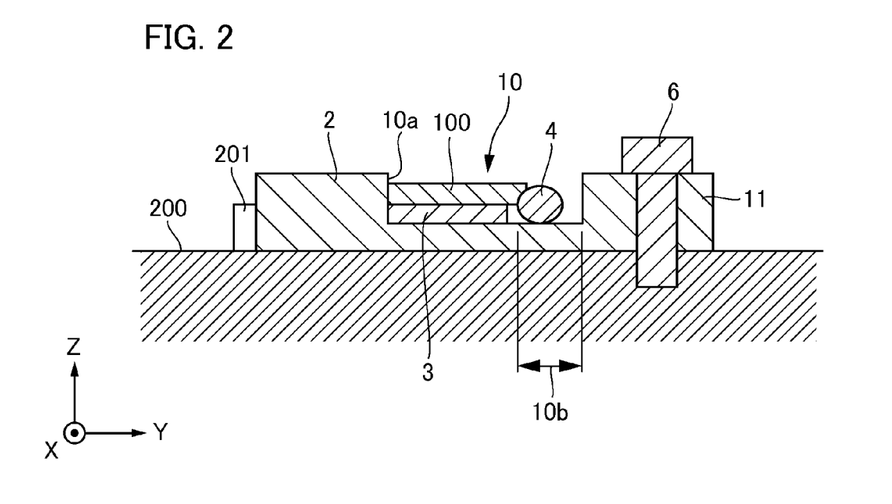
FIG. 2 is a diagram taken along a cross-section line A-A' in FIG. 1.

Firstly, a description will be given of a scale holding device according to a first embodiment of the present invention. For example, the scale holding device according to the present embodiment holds a scale serving as a measurement reference for an encoder which is a measuring device for measuring positions or angles and indirectly fixes the scale to a mounting object. The scale is formed with a pattern which is read by an encoder. In particular, in the present embodiment, it is assumed that the scale is an elongated (straight edge) metallic tape-like scale having flexibility (substantial elasticity), which is employed in a linear encoder. The scale has a thickness of not less than 0.1 mm and less than 0.5 mm. The scale in the present embodiment may be formed of a stainless tape on which a pattern for an absolute encoder is written. Note that the present invention is not limited thereto but may also be applicable to, for example, a scale for an incremental encoder. The material of the tape-like scale is not limited to a metal but may also be a resin depending on the application and accuracy. FIG. 1 is a perspective view illustrating a configuration of a scale holding device 1 according to the present embodiment. FIG. 2 is a diagram taken along a cross-section line A-A' in FIG. 1. In the following diagrams including FIGS. 1 and 2, the X-axis is aligned in the elongated direction (longitudinal direction) of a scale 100 (a holding member 2) in a plane upon which the scale 100 is affixed (upon which the holding member 2 is mounted), the Y-axis is aligned in a direction perpendicular to the elongated direction, and the Z-axis is aligned in a direction perpendicular to the XY-plane. The scale holding device 1 includes a holding member 2 for fixedly holding the scale 100, an affixing member 3, two types of fixing members 4 and 5, and a plurality of screws 6 for fastening the holding member 2 to a target object (mounting object) 200. Among them, the affixing member 3 and two types of fixing members 4 and 5 are adhesive means configured to bond the scale 100 and the holding member 2 in the present embodiment.

The holding member (attachment plate) 2 fixedly holds the scale 100 via adhesive members such as the affixing member 3 and the fixing members 4 and 5 to be described in detail below and the scale 100 is fixed at a position (mounting position) of a target object 200 from which the scale 100 is extended. The holding member 2 is a planar member having a length dimensioned according to the scale 100, and has a locating section 10 and screwed connections (a first fastening section 11 and a second fastening section 12). The locating section 10 is formed on the surface opposite to the surface facing the target object 200 and is a section on which the scale 100 is mounted. Here, the locating section 10 is a groove formed in the holding member 2 as shown in FIG. 2 as an example. When the locating section 10 is a groove as described above, the width of the groove is set to be slightly wider than the width of the scale 100. Furthermore, one lateral side (first surface) 10a of the locating section 10 is a reference surface against which the lateral side (first lateral side) of the scale 100 is brought into abutment (impinged). Thus, when the scale 100 is mounted on the locating section 10, a gap occurs between a lateral side opposite to the lateral side serving as a reference surface and the other lateral side (second lateral side) of the scale 100. The material of the holding member 2 includes, for example, a stainless steel but may be selected as appropriate depending on the material of the target object 200 and the intended application of the encoder.

The screwed connection is a section for fixing (fastening) the holding member 2 to the target object 200 using a screw (fastening member). When the holding member 2 is assumed to be fixed by having it abut to a plurality of reference pins 201, which are installed in advance on the target object 200, for positioning the holding member 2, the screwed connection is provided in plural on the holding member 2 at the side opposite to the side at which the holding member 2 is brought into abutment against the reference pins 201 so as to be spaced at regular intervals in the elongated direction. In particular, in the present embodiment, among a plurality of screwed connections, one screwed connection is defined as the first fastening section 11 serving as a fastening reference and other plural screwed connections are defined as the second fastening sections 12 each having a stress relaxing groove. As shown in FIG. 2, the first fastening section 11 is a through hole through which a screw 6 simply passes so as to engage the screw-threaded hole formed in the target object 200, so that the holding member 2 is completely fixed to the target object 200 at the section (area). In contrast, the second fastening section 12 has a hole through which the screw 6 passes and a stress relaxing groove which is present around the hole and relaxes the stress which may be generated by fastening with the screw 6 within the range of stress applied.

Figure 3:
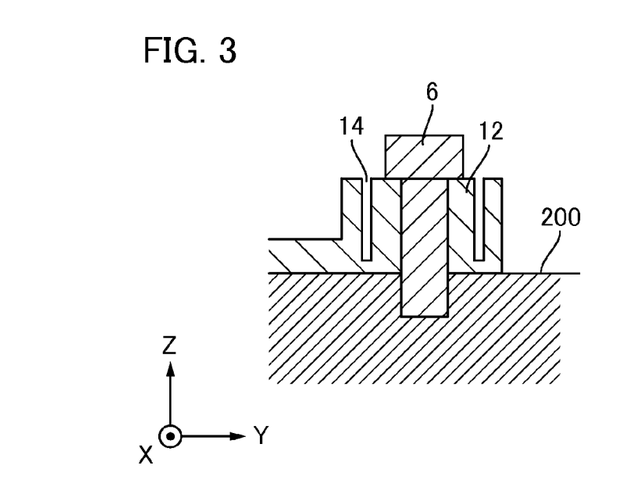
FIG. 3 is a diagram illustrating a state where a scale is affixed to a holding member.

FIG. 3 is a cross-sectional view illustrating a configuration (shape) of the second fastening section 12. A stress relaxing groove 14 is an elastic hinge groove which is circumferentially formed outside where the axial force of the screw 6 is applied on the second fastening section 12. The stress relaxing groove 14 can relax not only the stress as described above but also a difference between the expansion/contraction of the holding member 2 and that of the target object 200, such as thermal expansion or the like, which may be caused by the difference in environmental temperatures between the holding member 2 and the target object 200. When it is assumed that the scale 100 has a length of 10 m and a difference in linear expansion coefficients between the holding member 2 and the target object 200 is 5 ppm/($°$ C.), a difference in total length between the holding member 2 and the target object 200 generally becomes 50 μm under a difference in temperature of 1 ($°$ C.). Hence, the stress relaxing groove 14 is provided so that the difference in change in length between the holding member 2 and the target object 200 may be relaxed and deterioration of a adhesive portion due to a difference between the repeated expansion/contraction of the holding member 2 and that of the target object 200 and a change in accuracy of the scale 100 may be reduced. Note that the stress relaxing groove 14 is not limited to a circumferential groove but may also be any groove having other shapes.

The affixing member 3 is a first adhesive material for affixing the scale 100 to the surface (second surface facing the rear side of the scale 100) of the locating section 10 of the holding member 2 from the rear side of the affixing member 3. In particular, in the present embodiment, the affixing member 3 has elasticity for relieving slight distortion or the like of the holding member 2 and (removable) adhesiveness for readily affixing and peeling-off of the scale 100 to and from the holding member 2 and also has properties to allow temporary securing of the scale 100 on the holding member 2 when the scale 100 is mounted on the holding member 2. With regard to elasticity, the elastic force of the scale 100 is greater than that of the affixing member 3. Specifically, the scale 100 needs to be made of a material harder than the affixing member 3. Here, assume that the affixing member 3 is double-sided adhesive tape, the scale 100 is stainless steel tape, and the scale 100 has a thickness of 0.2 mm. In this case, in order to ensure the elastic force in the thickness direction of double-sided tape, double-sided tape made of, for example, a polyester film and having a thickness of about 0.2 mm may be selected. Next, with regard to adhesiveness, the adhesive strength of the affixing member 3 may be to an extent such that the scale 100 does not substantially peel off from the affixing member 3. For example, it is preferable that the adhesive strength relative to the scale 100 is 3.0 kN/m or less, whereas the adhesive strength relative to the holding member 2 is 4.0 kN/m or more. Note that each of these defined numerical values is merely a measure and may vary depending on the affinity between materials of the scale 100 and the holding member 2 and the adhesive portion. Furthermore, while the aforementioned description has been given on the assumption that double-sided tape is used as the affixing member 3, the affixing member 3 may also be a substrate-less adhesive or a urethane adhesive having an elastic layer. The affixing member 3 is not limited to a tape-like one but may also be formed by spray coating provided that a uniform thickness can be ensured.

The first fixing member (first adhesive) 4 and the second fixing member (second adhesive) 5 are a second adhesive material for fixing the scale 100 and the bottom surface (adhesive surface 10b) of the locating section 10 together at an area on the second lateral side opposite to the first lateral side against which the scale 100 mounted on the locating section 10 of the holding member 2 is brought into abutment. Specifically, in the state where the scale 100 is brought into abutment against the reference surface 10*a*, the fixing members 4 and 5 are present at a position in which a distance of the fixing members 4 and 5 from the reference surface 10*a* is more distant than a distance of the affixing member 3 from the reference surface 10*a*. In other words, the affixing member 3 is positioned nearer to the reference surface 10*a* than the fixing members 4 and 5 at any position. The adhesive strength of the fixing members 4 and 5 to the scale 100 is stronger than that of the affixing member 3 to the scale 100, so that the scale 100 is firmly bonded to the fixing members 4 and 5 to some extent. Specifically, in other words, the adhesive strength of the affixing member 3 to the scale 100 is weaker than that of the fixing members 4 and 5 to the scale 100, so that the scale 100 can be repositioned. Firstly, the first fixing member 4 is intended to inelastically fix the scale 100 to the holding member 2 at at least one area in the elongated direction of the scale 100, i.e., at one portion only around the substantially central section of the holding member 2 in the examples shown in FIG. 1 (in a sense of a distance in the elongated direction of the holding member 2, an area having a length of about, for example, 5 mm). Here, the term "inelastically fix" refers to fixation to such an extent that positional deviation does not readily occur between the scale 100 and the holding member 2. Thus, the first fixing member 4 needs to exhibit a desired hardness after curing to such an extent that the positional deviation does not readily occur. The first fixing member 4 may be formed by adhesive fixation of a two-liquid room temperature rapidly-curing type epoxy adhesive to the holding member 2 but may also be other adhesives provided that they have a desired hardness after adhesive curing and have compatibility with a substrate (the scale 100 or the holding member 2). Instead of forming the first fixing member 4 using adhesive, the first fixing member 4 may also be formed by fixing a metal on the holding member 2. Next, the second fixing member 5 is intended to elastically fix the scale 100 to the holding member 2 at an area other than that at which the first fixing member 4 is fixed to the holding member 2 in the elongated direction of the scale 100. Here, the term "elastically fix" refers to fixation with elasticity to such an extent that distortion between the scale 100 and the holding member 2 can be relaxed upon occurrence of positional deviation therebetween. Thus, the second fixing member 5 needs to exhibit a desired softness after curing to such an extent that the distortion of both the scale 100 and the holding member 2 can be relaxed even upon occurrence of the positional deviation therebetween. The second fixing member 5 may be formed by adhesive fixation of a silicon adhesive to the holding member 2 but may also be other adhesives provided that they have a desired elasticity after adhesive curing and have compatibility with the substrate. Upon selecting these adhesives, it is preferable that an adhesive having small curing shrinkage as much as possible is selected so as to reduce the distortion before and after mounting of the scale 100 on the holding member 2.

Next, a description will be given of the mounting procedure of the scale 100 using the scale holding device 1. Firstly, the operator mounts the holding member 2 on the mounting surface of the target object 200 (first step). At this time, the holding member 2 is fastened with the screws 6 to the target object 200 via screwed connections while at least a part of one lateral side (lateral side at which no screwed connection is present) of the holding member 2 is brought into abutment against the reference pins 201 which are installed in advance on the target object 200. Note that, while the foregoing embodiment assumes that the reference pin 201 is used as a positioning reference, the target object 200 may also be stepped in advance so as to provide a reference portion instead of the reference pin 201. Upon fastening with the screw 6, the holding member 2 is firstly fastened to the target object 200 at the first fastening section 11 which is closest to the mounting reference position (the position is referred to as a "datum reference" serving as a fixed point for an elastic change in length of the second fixing member 5) of the scale 100. Then, the holding member 2 is fastened to the target object 200 while other second fastening sections 12 are sequentially brought into abutment against the reference pins 201.

Figure 4:
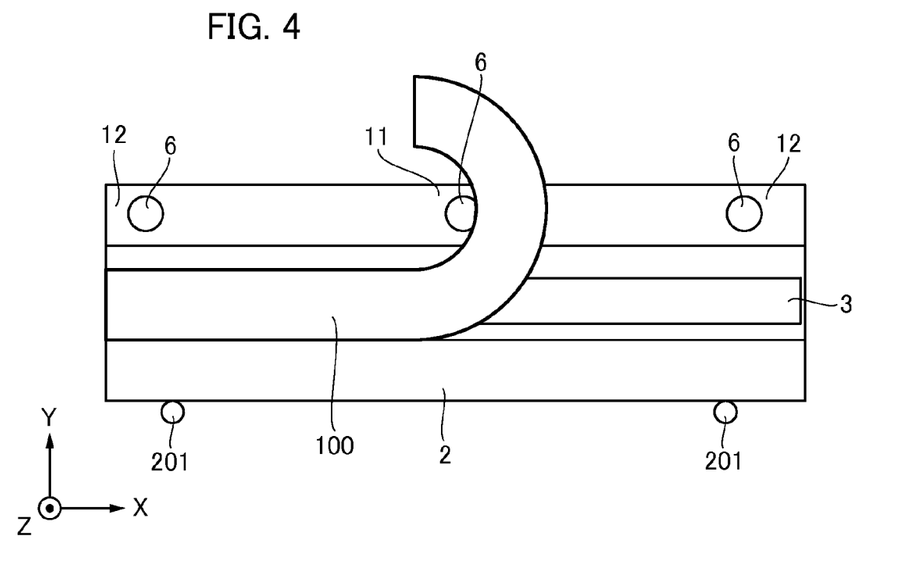
FIG. 4 is a diagram illustrating the shape of a second fastening section having a stress relaxing groove.

Next, the operator affixes the scale 100 to the locating section 10 of the holding member 2 mounted on the target object 200 (second step). FIG. 4 is a plan view (top view) illustrating the scale holding device 1 mounted on the target object 200 in order to explain the second step. Firstly, the affixing member 3 is disposed (affixed) to the locating section 10 before the scale 100 is affixed to the locating section 10. Since the scale 100 is an elongated member, the operator gradually affixes the scale 100 to the affixing member 3 from one end of the holding member 2 toward the other end as shown in FIG. 4. At this time, the operator affixes the scale 100 to the affixing member 3 while one lateral side of the scale 100 is brought into abutment against the reference surface 10*a* provided at the locating section 10. Here, the adhesive strength of the affixing member 3 to the scale 100 is strong to an extent that the scale 100 is readily peeled off from the affixing member 3 as described above. Thus, even when the operator cannot affix the scale 100 to the affixing member 3 with the scale 100 being aligned with the lateral side 10*a*, the operator can temporarily peel off the scale 100 to a required extent, so that the scale 100 is capable of being bonded to the affixing member 3 again (is repositionable). In accordance with this configuration, the operator performs an affixing operation while the scale 100 is brought into abutment against the reference surface 10*a*. No skilled affixing technique is required for the operator without requiring any special tool, so that the affixing operation can be performed in a short time. Furthermore, since the affixing member 3 has suitable elasticity as described above, the distortion generated when the holding member 2 is mounted on the target object 200 can be suppressed from being transmitted to the scale 100. Thus, the pattern formed on the scale 100 is not susceptible to the distortion influence, so that the scale 100 is temporarily fixed to the holding member 2 so as to obtain a smooth pattern surface.

Next, the operator permanently fixes the temporarily fixed scale 100 to the locating section 10 (third step). Firstly, the operator drops an adhesive suitable at a datum reference on the adhesive surface 10*b* and cures the adhesive to form the first fixing member 4. Then, the operator drops a suitable amount of an adhesive on the remaining adhesive surface 10*b* and cures the adhesive to form the second fixing member 5. Finally, the operator fixes the scale 100 to the locating section 10. In FIGS. 1 and 2, a part of the fixing members 4 and 5 is brought into contact with the lateral side of the scale 100 so as to be viewable from the outside after bonding. However, bringing the fixing members 4 and 5 into contact with the lateral side of the scale 100 is not necessarily a requirement. For example, an adhesive may be injected to a space sandwiched between the rear side of the scale 100 and the holding member 2 using a thin nozzle so as to bring the fixing members 4 and 5 into contact only with the rear side of the scale 100.

As described above, the locating section 10 provided in the scale holding device 1 firstly has a groove, which forms the reference surface 10a against which the lateral side of the scale 100 is brought into abutment, having a width greater than at least the width of the scale 100. Furthermore, in the present embodiment, the affixing member 3 is intended to be used for temporary fixing of the scale 100 instead of permanent fixing of the scale 100. Based on this configuration, the operator readily affixes (temporarily fixes) the elongated scale 100 to the holding member 2 using the affixing member 3 while maintaining the mounting accuracy, and then permanently fixes the elongated scale 100 to the holding member 2 using the first fixing member 4 and the second fixing member 5, resulting in ease of mounting operations by the operator. In addition, the affixing member 3 has elasticity and the scale 100 is inelastically fixed to the holding member 2 at the datum reference only but is elastically fixed thereto at other positions. Thus, the distortion generated when the holding member 2 is mounted on the target object 200 is suppressed from being transmitted to the scale 100, resulting in a reduction in distortion of the pattern formed on the scale 100. This also leads to an improvement in conformation of the holding member 2 to the mounting surface of the target object 200 and elimination of necessity for requiring highly-accurate machining for the mounting surface, resulting in an improvement in machinability of the target object 200. Furthermore, the scale 100 is inelastically fixed to the holding member 2 at the datum reference only but is elastically fixed thereto at other positions and the holding member 2 is completely fixed to the target object 200 at the first fastening section 11 which is closest to the datum reference but is elastically fixed to the target object 200 at other second fastening sections 12. Thus, absorption/relaxation of contraction of members due to thermal stress and reduction in displacement between members can be realized against thermal changes caused by environmental temperature factors or changes over time while maintaining the reference position of the scale 100 by fixed positioning particularly in the elongated direction at the datum reference.

As described above, according to the present embodiment, a scale holding device which is advantageous in terms of ease of mounting operations and reduction of the distortion which may be imposed on a scale, when the scale is indirectly fixed to a mounting object, may be provided.

Figure 5:
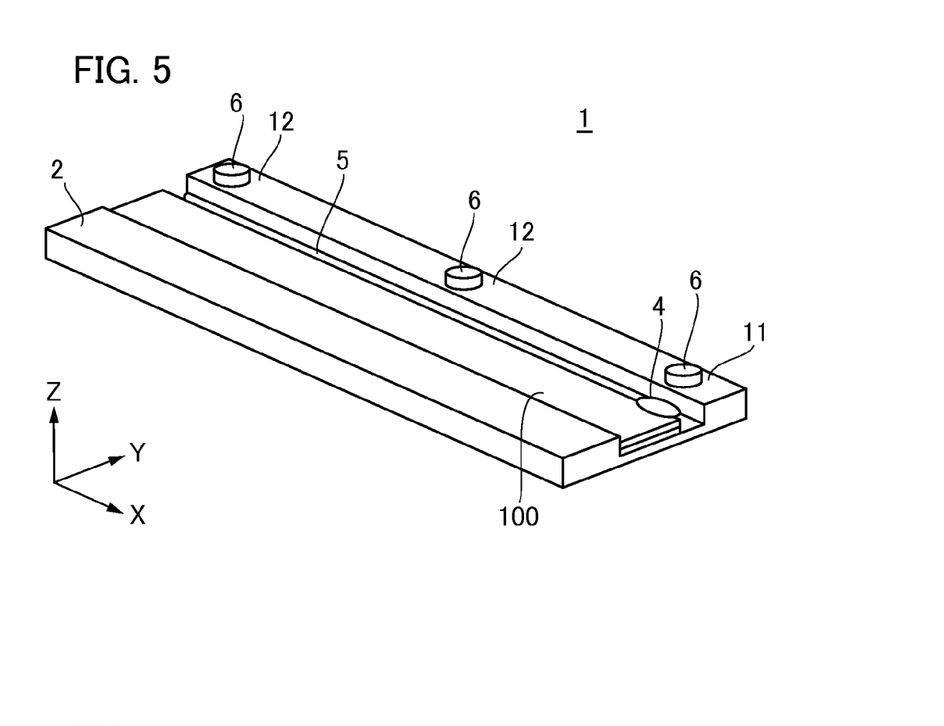
FIG. 5 is a diagram illustrating a configuration of a scale holding device with a datum reference formed at the end thereof.

While, in the present embodiment, the datum reference (the installation position of the first fixing member 4 and the first fastening section 11) is provided at the central section of the holding member 2 in the elongated direction, the datum reference may also be provided at the end of the holding member 2 in the elongated direction as shown in FIG. 5. The installation position of the datum reference may be determined in accordance with a reference when the target object 200 is driven, i.e., the reference (e.g., drive zero point) of the encoder when the scale 100 (the scale holding device 1) is employed.

In the present embodiment, the shape (cross-sectional shape) of the locating section 10 is a groove. This is advantageous in that a liquid adhesive can be avoided from being leaked (flown down) to the outside of the locating section 10 when the adhesive to be formed as the first fixing member 4 and the second fixing member 5 is applied to the locating section 10. However, when there is little concern regarding such a leakage of an adhesive, there is no need to form the shape of the locating section 10 into a groove but the height of the side on which a plurality of screwed connections is formed as viewed from the cross section shown in FIG. 2 may be the same as that of the adhesive surface 10b. Furthermore, the holding member 2 may also be configured such that a protrusion having the reference surface 10a is simply formed on a planar member.

(Second Embodiment)

Figure 6:
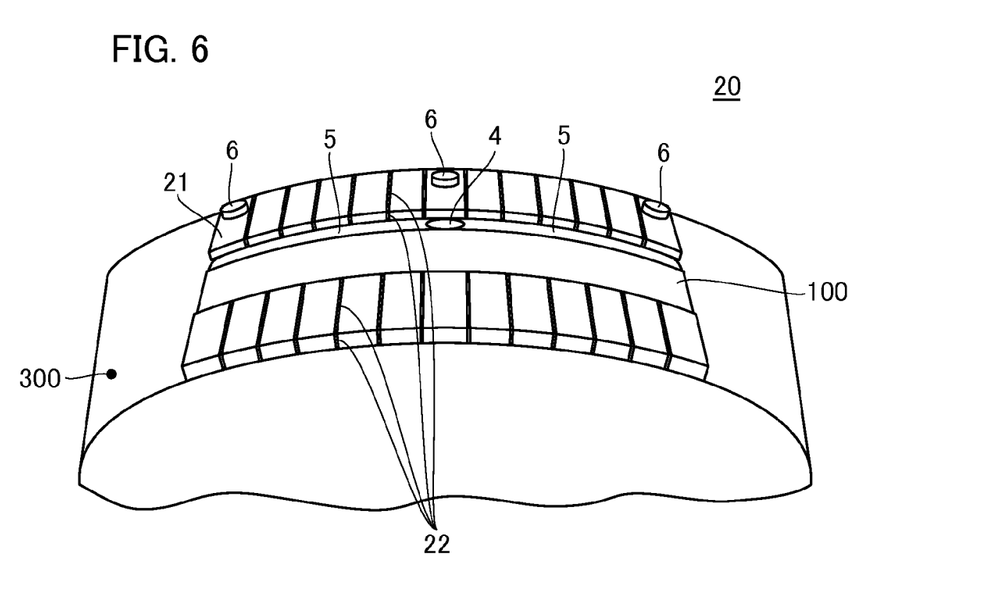
FIG. 6 is a diagram illustrating a configuration of a scale holding device according to a second embodiment of the present invention.

Next, a description will be given of a scale holding device according to a second embodiment of the present invention. A feature of the scale holding device according to the present embodiment lies in the fact that a holding member in which a plurality of grooves is formed in sections other than the locating section 10 is employed instead of the holding member 2 according to the first embodiment. FIG. 6 is a perspective view illustrating a configuration of a scale holding device 20 according to the present embodiment. In FIG. 6, the same elements as those in the scale holding device 1 according to the first embodiment shown in FIG. 1 are designated by the same reference numerals and explanation thereof will be omitted. Firstly, the surface of a target object 300 in this case, on which the holding member 20 is mounted, is not a plane but has a curved surface having a curvature to some extent. For that curved surface, the holding member 20 has a plurality of grooves (slits) 22 each of which is directed toward a direction perpendicular to the elongated direction of the holding member 20 and which are juxtaposed in the elongated direction. With this arrangement, the holding member 20 can be deformed in accordance with the shape of the surface of the target object 300 on which the holding member 20 is mounted by changing the width of each of the plurality of grooves 22. The scale holding device 20 can accurately affix the scale 100 to the curved surface of the target object 300 with the aid of deformation effects of the holding member 20 and elastic effects of the affixing member 3 and the second fixing member 5 while reducing the influence of distortion or undulation of the mounting surface of the target object 300. Note that the depth of the groove 22 is not particularly limited provided that the holding member 2 can be deformed as appropriate. Thus, according to the present embodiment, the same effects as in the first embodiment can be obtained. Even when the mounting surface of the target object 300 is a curved surface, mounting accuracy may be favorably maintained with an improvement in the adhesion properties of the holding member 20 to the target object 300.

(Measuring Apparatus)

Next, a description will be given of a measuring device according to one embodiment of the present invention. The measuring device according to the present embodiment is an encoder that performs optical or magnetic measurement of positions or angles. The encoder includes the scale 100 that is to be fixed to the target object 200 (300) serving as an object to be measured using the scale holding device 1 (20) described in the above embodiments and a detecting unit that detects light or magnetism from the scale 100. The type of the encoder is not particularly limited but may be either incremental or absolute. The measuring device according to the present embodiment is advantageous for at least one of improvement in productivity upon assembling the measuring device and improvement in measurement accuracy by an improvement in mounting accuracy as compared with the conventional method.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-103112 filed on May 15, 2013, which is hereby incorporated by reference herein in its entirety.

What is claimed is:

1. A scale holding device comprising:
    a scale;
    an attachment plate configured to hold the scale and have a first surface abutting on a first lateral side of the scale and a second surface facing a rear side of the scale;
    a first adhesive material configured to removably adhere the second surface of the attachment plate and the rear side of the scale to each other; and
    a second adhesive material configured to adhere the scale and the attachment plate to each other on a second lateral side of the scale,
    wherein the second adhesive material includes a first adhesive which is applied to one portion only of the second lateral side and a second adhesive which is applied to an area of the second lateral side different from that to which the first adhesive is applied and has weaker adhesive strength than the first adhesive.

2. The scale holding device according to claim 1, wherein the first adhesive material is configured to adhere the second surface of the attachment plate and the rear side of the scale to each other using an adhesive tape.

3. The scale holding device according to claim 1, wherein the first adhesive material has an adhesive strength of 3.0 kN/m or less.

4. The scale holding device according to claim 1, wherein the second surface of the attachment plate is configured to be adhered to the rear side of the scale via the first adhesive material alone.

5. The scale holding device according to claim 1, wherein the first adhesive includes an epoxy adhesive.

6. The scale holding device according to claim 1, wherein the second adhesive includes a silicon adhesive.

7. The scale holding device according to claim 1, wherein the scale has a thickness of not less than 0.1 mm and less than 0.5 mm.

8. The scale holding device according to claim 1, wherein the attachment plate has a screw hole for fastening the attachment plate to an object to be measured by a screw and a groove provided around the screw hole.

9. The scale holding apparatus according to claim 1, wherein an adhesive strength of the second adhesive material is stronger than that of the first adhesive material.

10. The scale holding device according to claim 1, wherein the attachment plate has a plurality of grooves arranged in a direction different from an elongated direction of the attachment plate.

11. A scale holding device comprising:
    a scale;
    an attachment plate configured to hold the scale and have a first surface abutting on a first lateral side of the scale and a second surface facing a rear side of the scale;
    a first adhesive means configured to removably adhere the second surface of the attachment plate and the rear side of the scale to each other; and
    a second adhesive means configured to adhere the scale and the attachment plate to each other on a second lateral side of the scale,
    wherein the second adhesive means includes a first adhesive which is applied to one portion only of the second lateral side and a second adhesive which is applied to an area of the second lateral side different from that to which the first adhesive is applied and has weaker adhesive strength than the first adhesive.

12. An encoder that detects a position or an angle of an object to be measured, the encoder comprising:
    a scale holding device comprising:
    a scale;
    an attachment plate configured to hold the scale and have a first surface abutting on a first lateral side of the scale and a second surface facing a rear side of the scale;
    a first adhesive material configured to removably adhere the second surface of the attachment plate and the rear side of the scale to each other; and
    a second adhesive material configured to adhere the scale and the attachment plate to each other on a second lateral side of the scale; and
    a detector configured to detect light or magnetism from the scale of the scale holding device,
    wherein the second adhesive material includes a first adhesive which is applied to one portion only of the second lateral side and a second adhesive which is applied to an area of the second lateral side different from that to which the first adhesive is applied and has weaker adhesive strength than the first adhesive.

13. A scale holding device that holds a scale comprising:
    an attachment plate configured to hold the scale and have a first surface abutting on a first lateral side of the scale and a second surface facing a rear side of the scale;
    a first adhesive material configured to removably adhere the second surface of the attachment plate and the rear side of the scale to each other; and
    a second adhesive material configured to adhere the scale and the attachment plate to each other on a second lateral side of the scale,
    wherein the second adhesive material includes a first adhesive which is applied to one portion only of the second lateral side and a second adhesive which is applied to an area of the second lateral side different from that to which the first adhesive is applied and has weaker adhesive strength than the first adhesive.

14. A scale holding device comprising:
    a scale including a front side with a pattern;
    an attachment plate which holds the scale and includes a first surface abutting on a first lateral side, adjacent to the front side, of the scale and a second surface facing a rear side, opposite from the front side, of the scale;
    a first adhesive material configured to removably adhere the second surface of the attachment plate and the rear side of the scale to each other; and
    a second adhesive material configured to adhere the scale and the attachment plate to each other on a second lateral side, different from the first lateral side, of the scale.

15. The scale holding device according to claim 14, wherein the first adhesive material is configured to adhere the second surface of the attachment plate and the rear side of the scale to each other using an adhesive tape.

16. The scale holding device according to claim 14, wherein the first adhesive material has an adhesive strength of 3.0 kN/m or less.

17. The scale holding device according to claim 14, wherein the second surface of the attachment plate is configured to be adhered to the rear side of the scale via the first adhesive material alone.

18. The scale holding device according to claim 14, wherein the second adhesive material includes a first adhesive which is applied to one portion only of the second lateral side and a second adhesive which is applied to an area of the second lateral side different from that to which the first adhesive is applied and has adhesive strength weaker than that of the first adhesive.

19. The scale holding device according to claim 18, wherein the first adhesive includes an epoxy adhesive.

20. The scale holding device according to claim 18, wherein the second adhesive includes a silicon adhesive.

21. The scale holding device according to claim 14, wherein the scale has a thickness of not less than 0.1 mm and less than 0.5 mm.

22. The scale holding device according to claim 14, wherein the attachment plate has a screw hole for fastening the attachment plate to an object to be measured by a screw and a groove provided around the screw hole.

23. The scale holding apparatus according to claim 14, wherein an adhesive strength of the second adhesive material is stronger than that of the first adhesive material.

24. An encoder that detects a position or an angle of an object to be measured, the encoder comprising:
   the scale holding device according to claim 14; and
   a detector configured to detect light or magnetism from the scale of the scale holding device.

25. A scale holding device comprising:
   a scale including a front side with a pattern;
   an attachment plate which holds the scale and includes a first surface abutting on a first lateral side, adjacent to the front side, of the scale and a second surface facing a rear side, opposite from the front side, of the scale;
   a first adhesive means configured to removably adhere the second surface of the attachment plate and the rear side of the scale to each other; and
   a second adhesive means configured to adhere the scale and the attachment plate to each other on a second lateral side, different from the first lateral side, of the scale.

26. A scale holding device for holding a scale including a front side with a pattern, the device comprising:
   an attachment plate configured to hold the scale, and including a first surface to abut on a first lateral side, adjacent to the front side, of the scale and a second surface to face a rear side, opposite from the front side, of the scale;
   a first adhesive material configured to removably adhere the second surface of the attachment plate and the rear side of the scale to each other; and
   a second adhesive material configured to adhere the scale and the attachment plate to each other on a second lateral side, different from the first lateral side, of the scale.

* * * * *